(12) United States Patent
Gupta (10) Patent No.: US 12,169,824 B1
(45) Date of Patent: Dec. 17, 2024

(54) BLANK CARD WITH DYNAMIC DATA CLUSTER ENCRYPTION

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 18/221,937

(22) Filed: Jul. 14, 2023

(51) Int. Cl.
*G06Q 20/34* (2012.01)
*G06Q 20/18* (2012.01)
*G06Q 20/38* (2012.01)

(52) U.S. Cl.
CPC ............ *G06Q 20/341* (2013.01); *G06Q 20/18* (2013.01); *G06Q 20/352* (2013.01); *G06Q 20/3829* (2013.01)

(58) Field of Classification Search
CPC .... G06Q 20/341; G06Q 20/18; G06Q 20/352; G06Q 20/3829
See application file for complete search history.

(56) References Cited

U.S. PATENT DOCUMENTS

| | | | |
|---|---|---|---|
| 8,966,288 B2 | 2/2015 | Ignatius et al. | |
| 9,049,010 B2 | 6/2015 | Jueneman et al. | |
| 9,483,664 B2 | 11/2016 | Chandra et al. | |
| 9,570,103 B2 | 2/2017 | Starr et al. | |
| 9,735,962 B1 | 8/2017 | Yang et al. | |
| 9,740,639 B2 | 8/2017 | Basmov et al. | |
| 10,007,910 B2 | 6/2018 | Von Mueller et al. | |
| 10,432,395 B2 | 10/2019 | Howe et al. | |
| 10,581,611 B1 * | 3/2020 | Osborn | H04L 63/1441 |
| 11,070,369 B2 | 7/2021 | Howe et al. | |
| 2016/0239836 A1 * | 8/2016 | von Mueller | H04L 63/0428 |
| 2021/0295312 A1 * | 9/2021 | Maeng | G06Q 20/3433 |
| 2021/0295315 A1 | 9/2021 | Hammad et al. | |

* cited by examiner

*Primary Examiner* — Sonji N Johnson
(74) *Attorney, Agent, or Firm* — Weiss & Arons LLP (57) ABSTRACT

Systems, methods, and apparatus for improving transaction security at a self-service kiosk are provided. A blank smart payment card may avoid storing sensitive identification data in an EMV chip or a magnetic stripe. The blank card may include a housing, with a wireless communication interface, microprocessor, and battery embedded in the housing. A card issuer may identify a dataset of sensitive information and apply dynamic clustering and encryption. The blank card may connect wirelessly to the issuer to obtain the encrypted clusters and store them in temporary storage. The blank card may self-authenticate to a kiosk by transmitting the encrypted clusters via a secure NFC connection. The kiosk may obtain a separate encryption key for each cluster from the issuer to decrypt and reconstruct the dataset. After every transaction, the issuer may apply new dynamic clustering to the dataset and replace the encrypted dataset stored on the blank card.

21 Claims, 5 Drawing Sheets

BLANK CARD WITH DYNAMIC DATA CLUSTER ENCRYPTION

FIELD OF TECHNOLOGY

Aspects of the disclosure relate to improving transaction security at self-service kiosks.

BACKGROUND OF THE DISCLOSURE

Payment cards, such as credit or debit cards, typically store sensitive customer data in a magnetic strip or an electronic chip such as an EMV chip. In most cases, data such as an account number, expiration date, and card verification value may also be printed on the card. In the course of a transaction, the sensitive data stored on the card may be read at self-service kiosks such as automated teller machines ("ATMs") and point-of-sale ("POS") terminals.

Annual losses from electronic crime associated with ATMs and POS devices may reach billions of dollars. One prevalent form of tampering is the practice of "skimming." Skimming typically involves modifying a device to capture information associated with a user access card. For example, a card reader device may be inserted over or within an original ATM card reader, a hidden camera may capture PIN entries, or a keypad overlay may capture keypad strokes. Because these modifications appear to be legitimate components of the ATM, skimming often goes undetected by users.

It would be desirable to use a smart payment card that bypasses conventional forms of data transfer. It would further be desirable to encrypt the payment card data prior to transfer to a self-service device to prevent capture by a bad actor. In particular, it would be desirable to incorporate features such as dynamic clustering prior to encryption and to use multiple customer-specific encryption keys.

SUMMARY OF THE DISCLOSURE

Systems, methods, and apparatus for improving transaction security at a self-service kiosk are provided.

A blank smart payment card may have a thickness not greater than 0.8 millimeters ("mm") and a surface area not greater than 86 mm×54 mm. The blank smart payment card may include a housing, and a wireless communication interface, microprocessor, and battery embedded in the housing. The wireless communication interface may include a network interface card and a near-field communication chip. The blank smart payment card may avoid storing sensitive identification data in an EMV chip or a magnetic stripe and may avoid printing information on a card surface.

An issuer of the blank smart payment card may identify a dataset of sensitive identification information. The issuer may dynamically cluster the dataset into a random number of clusters. The issuer may generate separate encryption keys for each cluster. The issuer may use the keys to encrypt the data clusters.

The blank smart payment card may initiate a first secure communication channel with the issuer using the network interface card. The blank smart payment card may obtain the encrypted clusters and store them in temporary memory. The blank smart payment card may initiate a second secure communication channel with the self-service kiosk using the NFC chip. The blank smart payment card may self-authenticate to the kiosk by transmitting the encrypted clusters to the kiosk using NFC. After self-authenticating, the blank smart payment card may purge the encrypted data clusters from temporary storage.

The self-service kiosk may obtain the encryption keys from the issuer. The kiosk may decrypt each cluster and combine them to reconstruct the dataset. The kiosk may authorize the transaction based on authentication of the dataset.

The blank card may encode no sensitive information other than the encrypted clusters. The blank card may transfer the encrypted clusters via a secure NFC channel. Even if the encrypted clusters were to be intercepted, a bad actor would not be aware of the number of clusters and would not possess the encryption keys to decrypt them. The encryption keys cannot be easily reconstructed because they are based on customer-specific past transaction data.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus for a smart card is provided. Apparatus may increase transaction security at an ATM, point-of-sale ("POS") terminal, or other self-service kiosks.

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided audio input. The I/O module may include one or more of a speaker for providing audio output and a display for providing textual, audiovisual and/or graphical output.

Software may be stored within non-transitory memory and/or other storage media. The software may provide instructions to the microprocessor for enabling the smart card to perform various functions. For example, non-transitory memory may store software used by the smart card, such as an operating system, application programs, web browser and a database. Alternatively, some or all of computer executable instructions may be embodied in hardware or firmware components of the smart card.

Application programs may include computer executable instructions for invoking user functionality related to communication, authentication services, and voice input and speech recognition applications. Application programs may utilize one or more algorithms that encrypt information, process received executable instructions, interact with a kiosk, manage communication between the smart card and a kiosk, perform power management routines or other suitable tasks.

The smart card may include a pressure sensitive button. The pressure sensitive button may have a thickness that is not greater than 0.8 mm. The pressure sensitive button may be actuated by a user to activate the smart card. For example, actuating the pressure sensitive button may activate the microprocessor or communication interface of the smart card.

In some embodiments, the smart card may be activated in response to receiving high frequency wireless signals. The high frequency signals may be detected by a communication interface of the smart card. High frequency signals may be broadcast by a kiosk. For example, a kiosk may include a near field communication ("NFC") reader that broadcasts high frequency signals. High frequency signals may provide power to one or more components of the smart card. In some embodiments, in response to receiving the power, the microprocessor may be activated and begin to draw power from a battery on the smart card.

The smart card may operate in a networked environment. The smart card may support establishing communication channels with one or more financial institutions and/or one or more kiosks. The smart card may connect to a local area network ("LAN"), a wide area network ("WAN") or any suitable network. When used in a LAN networking environment, the smart card may be connected to the LAN through a network interface or adapter. The communication interface may include a network interface or adapter.

When used in a WAN networking environment, the smart card may include a modem or other means for establishing communications over a WAN, such as the Internet. The communication interface may include the modem. The existence of any of various well-known communication protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, multiprocessor systems, microcomputers, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power to a communication interface and the microprocessor. The battery may have a thickness that is not greater than 0.5 mm.

The battery may be recharged via an electrical contact when the smart card is inserted into a card-reader of a kiosk. The smart card's power source may include high frequency signals received from a kiosk. The smart card may be configured to utilize received high frequency signals to recharge the battery or provide power to other components of the smart card.

The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to the rechargeable battery when the smart card is inserted into a kiosk card reader.

The smart card may include a communication interface. The communication interface may have a thickness that is not greater than 0.8 mm. The communication interface may include a circuitry for establishing with communication a financial institution and/or a kiosk. The financial institution may be a card issuer. The communication interface may be configured to implement protocols for wireless communication. The communication interface may include a wireless circuit. The communication interface may be configured to implement protocols for wired communication.

The wireless circuit may include software and/or hardware for establishing a wireless communication channel with the financial institution or the kiosk. Such protocols may include Wi-Fi, Bluetooth, Ethernet, NFC, satellite and cellular telecommunications. Wi-Fi may include passive Wi-Fi with lower power consumption than typical Wi-Fi. The smart card may be configured to communicate using a typical Wi-Fi range such as 150-300 ft. when searching for an available wireless communication channel.

A communication interface of the smart card may include an NFC chip. The NFC chip may communicate over a typical NFC communication range (~2 in.) when transmitting or receiving sensitive data. An illustrative NFC chip may utilize a 13.56 MHZ radio frequency. A microprocessor of the smart card may be configured to dynamically limit or expand transmitting and receiving ranges. The microprocessor may dynamically limit or expand transmitting and receiving ranges in response to a function of the smart card.

For example, the microprocessor may expand a communication range to communicate with a card issuer. Expanding a communication range may include using a Wi-Fi communication channel rather than an NFC communication channel. The microprocessor may limit a communication range when the smart card is communicating with a kiosk. The microprocessor may restrict the smart card to using NFC or contact-based communication channels to prevent unauthorized access by a bad actor.

In some embodiments, the smart card may be activated in response to receiving wireless signals from the kiosk. The wireless signals may provide power to one or more components of the smart card. For example, in response to receiving power via the wireless signals, a microprocessor of the smart card may be activated. Illustrative wireless signals may include NFC signals.

In some embodiments, the smart card may include an electrical contact that may be used to establish a wired or contact-based connection to the kiosk. The battery of the smart card may be recharged via the electrical contact when the smart card is in contact with the kiosk via the electrical contact.

The smart card may include a housing. The housing may provide a protective layer for internal components of the smart card. For example, the microprocessor may be embedded in and protected by the housing. The housing may be flexible. The housing may be constructed from plastic or other suitable materials. The housing may define a form factor of the smart card.

For example, a kiosk may include a card reader constructed to receive a card that conforms to a predefined form factor. As illustrative form factor is defined in specifications published by the International Organization for Standardization ("ISO"). Illustrative specifications may include ISO/IEC 7810, ISO/IEC 7811 and ISO/IEC 7816, which are hereby incorporated herein by reference in their respective entireties.

The kiosk may utilize information stored on the smart card to authenticate a user at the kiosk. In addition to information stored on the smart card, the kiosk may prompt the user for additional information before allowing the user to initiate a transaction at the kiosk. The additional information may include a PIN or biometric feature. After authenticating the user, the kiosk may allow the user to initiate a transaction at the kiosk. Illustrative transactions may include withdrawing cash, transferring funds between accounts or depositing cash/checks.

The smart card may include non-transitory memory locations within the housing. The microprocessor may access such memory locations. The non-transitory memory may be included in the microprocessor. The non-transitory memory locations may store machine readable instructions, that when executed by the microprocessor, cause the smart card to perform various functions. For example, the microprocessor, by executing the machine-readable instructions, may instruct the communication interface to scan for wired or wireless communication channels and connect to a detected kiosk.

The smart card may be a blank card with no account number printed on the surface of the housing. The smart card may be rendered without a magnetic strip to store data. The smart card may be rendered without a chip such as an EMV chip on the surface of the card to store data. In some embodiments, the smart card may include a logo associated with the card issuer. In some embodiments, the smart card may include a customer name.

The smart card issuer may define a dataset associated with the smart card. The dataset may be an alphanumeric string. The dataset may include any suitable sensitive identification data. For example, the dataset may include a name, an account number, and/or a social security number associated with a smart card user. The dataset may include a portion of a name or account number. The dataset may include an expiration date and/or a card verification value (CVV). The dataset may include an identifier associated with a prior transaction such as a transaction code or a transaction amount. The dataset or a predetermined portion of an identifier or a predetermined portion of a transaction amount such as the first three digits or last three digits.

The smart card issuer may dynamically cluster the dataset into a number of clusters. The number of clusters may be randomly selected by a clustering algorithm. The number of clusters may change each time the algorithm is applied.

The smart card issuer may generate a different encryption key for each of the dynamic clusters. The encryption keys may be customized for the smart card user. The encryption keys may be based on prior transaction data. The encryption keys may be alphanumeric strings. Each encryption key may be applied to transform one of the clusters. The transformation may use any suitable encryption algorithm.

The smart card may receive the encrypted data clusters from the card issuer via the wireless communication interface. In some embodiments, the microprocessor may direct the communication interface to request the encrypted data clusters from the card issuer. In some embodiments, the encrypted data clusters may be pushed to the smart card.

The smart card may include a transient data encryption module. The transient data encryption module may temporarily store the encrypted clusters of sensitive data in smart card memory. The smart card may purge the encrypted clusters from memory after a transaction is complete.

The encrypted sensitive data may be replaced after each transaction. The encrypted sensitive data may be replaced after a specified number of transactions. The encrypted sensitive data may be replaced on a periodic basis regardless of the number of transactions carried out using the smart card.

At the time of transaction, the smart card may communicate the encrypted clusters to a self-service kiosk. The communication may be a card-to-device contactless transfer of customer information. The smart card may communicate with the self-service kiosk using the communication interface. The communication interface may be restricted to NFC for communication with the kiosk. The short range of NFC may add another layer of security to the communication. The smart card may be positioned within a predetermined distance of the kiosk.

The kiosk may confirm card identifier data associated with the smart card. The data may be retrieved from an NFC tag embedded in the smart card. The card identifier data may include non-sensitive identification data associated with a smart card user and with the smart card.

After receiving the card identifier and the encrypted data clusters, the kiosk may communicate with the smart card issuer. The kiosk may receive the encryption keys from the smart card issuer. The kiosk may decrypt the clusters and reconstruct the dataset in order to authenticate the smart card.

At the conclusion of the transaction, the smart card data may be erased. The smart card issuer may apply new dynamic clustering to the card dataset. The dataset may be randomly clustered into a different number of clusters. The smart card issuer may generate new encryption keys to encrypt the dynamic clusters. The smart card may communicate with the card issuer using the communication interface to receive the new encrypted clusters.

The blank smart card is protected from incursion by a bad actor as there is no data that can be skimmed directly from a chip or magnetic stripe. There is no data that can be skimmed from keypad entry. There is no data printed on the card (such as a name, expiration date or card verification value) that could be read by a hidden camera. Even if a bad actor were able to obtain the encrypted data clusters during an NFC transfer to a self-service kiosk, they would not know how many clusters were formed from the dataset or how to recreate the individual custom encryption keys. Only the financial institution is aware of the number of clusters and the criteria applied to generate the encryption keys.

In some embodiments, the dataset may be dynamically clustered and encrypted on the smart card. The microprocessor may encrypt the sensitive data. The smart card may include a dedicated encryption controller for performing the encryption. The microprocessor may store the encrypted data locally on the smart card.

In some embodiments, the card issuer may generate a new dynamically clustered and encrypted dataset after each transaction. In some embodiments, the card issuer may replace the dataset after a predetermined number of transactions or after a predetermined time interval.

The microprocessor may be configured to delete data stored on the smart card after expiration of a pre-determined time period or after a pre-determined number of transactions. The microprocessor may replace the data stored on the smart card in response to receiving a new dataset from the card issuer.

The smart card may have an inactive state. In the inactive state, the microprocessor may not supply power to the communication interface. In the active state, the microprocessor may capture and/or encrypt data.

The inactive state may be a default state. The microprocessor may toggle the communication interface between the inactive and active states. For example, the microprocessor may activate the communication interface in response to establishing or detecting a communication channel of a kiosk.

A wireless interface of the smart card may include an inactive state. When in the inactive state, the wireless interface may be unable to connect to a communication channel or transmit data. The wireless interface may include an active state. In the active state, the wireless interface may be capable of connecting to a communication channel, receiving data or transmitting data. The microprocessor may toggle the wireless interface from the inactive state to the active state. The microprocessor may toggle the wireless interface from the active state to the inactive state.

The microprocessor may require a special code to unlock the wireless interface. The microprocessor may require that the smart card establish a wired connection to unlock the wireless interface. For example, the wireless interface may only be unlocked when the smart card is inserted into a card reader of a kiosk. The smart card may also require entry of a valid at the kiosk before unlocking the wireless interface.

A system increasing for transaction processing efficiency of an ATM, POS terminal or other self-service kiosk is provided. The system may include a smart card having a thickness not greater than 0.8 mm. The smart card may have a width not greater than 54 mm. The smart card may have a length not greater than 86 mm.

The system may include a communication interface. The communication interface may be embedded in the smart card. The communication interface may include hardware and software for communicating with a kiosk. For example, the smart card may include circuitry for communicating over Wi-Fi, NFC, Bluetooth, cellular, satellite or any suitable wireless network or protocol. The communication interface may include a wired communication interface. For example, the smart card may include circuitry and externally accessible electrical contact(s) for communicating over a wired Ethernet or any suitable wired network or protocol.

The system may include a microprocessor. The microprocessor may be embedded in the smart card. The microprocessor may control communication conducted using the communication interface. For example, the microprocessor may initiate communication with a kiosk using the communication interface. The microprocessor may terminate communication with the kiosk by turning off the communication interface. Turning off the communication interface may include disconnecting from a kiosk communication channel. Turning off the communication interface may include terminating an ongoing communication session with the kiosk. Turning off the communication interface may include cutting off power supplied to the communication interface.

The system may include machine executable instructions. The executable instructions may be stored in a non-transitory memory on the smart card. In some embodiments, the executable instructions may be stored in a non-transitory memory on the kiosk. The executable instructions may be transferred to the smart card using a communication channel established using the communication interface of the smart card.

The microprocessor may self-authenticate a user or the smart card. Self-authentication may be conducted over a communication channel using established the communication interface. The communication channel may be a secure communication channel linking the smart card and the kiosk.

A kiosk may only establish a secure communication channel with the smart card when the smart card is within a threshold distance of the kiosk. When the smart card is within the threshold distance, the smart card may be likely or expected to access the kiosk. In some embodiments, the secure communication channel may only be established when the smart card initiates a request to establish a secure communication channel.

The system may include a bank integration module. The bank integration module may enable the self-service kiosk to establish communication with an issuer bank and obtain the encryption keys.

The system may include a dynamic cluster module. The dynamic cluster module may dynamically generate clusters from a superset of user data.

The system may include an arbitrary encryption key module. The arbitrary encryption key module may obtain the encryption keys and encrypt the data clusters.

The system may include a cluster update interface. The cluster update interface may control the replacement of encrypted data clusters on the smart card after a transaction is complete.

The system may include a data decryption module. The data decryption module may use the encryption keys obtained from the issuer bank to decrypt the clusters.

The system may include a transient data encryption module. The transient data encryption module may maintain encrypted data received from the issuer bank in temporary card storage.

The system may include a payment initiation engine. In response to authentication of the smart card, the payment initiation engine may initiate a transaction.

The system may include an interface with a regulatory authority such as a third-party payment processor. The third-party payment processor may specify protocols related to the clustering, encryption, and/or transfer of sensitive data.

The system may include a front controller. The front controller may be included in the kiosk. Using a kiosk communication channel, the front controller may receive encrypted input data from the smart card via the communication interface.

The encrypted data may include transaction instructions. The transaction instructions may be received by the front controller from a cloud computing system.

The system may include a decryption controller. The decryption controller may be included in the kiosk. The decryption controller may decrypt encrypted data received by the kiosk from the smart card.

The system may include an input validation controller. The input validation controller may communicate with a remote computer server. The remote computer serer may be a cloud computing system. The remote computer server may validate the encrypted data received from the smart card. Validating may include retrieving a set of encryption keys associated with the smart card.

The system may include a payment dispatcher. The payment dispatcher may be included in the kiosk. The payment dispatcher may dispense cash or other items in response to a positive validation received from the input validation controller.

The smart card may include a wireless communication interface. The executable instructions stored in a non-transitory memory may scan for a wireless kiosk communication channel. A kiosk wireless communication channel may only be detectable when the smart card is within a threshold distance of a kiosk. For example, the kiosk wireless s communication channel may be purposefully configured to have a maximum transmission range that is limited to a threshold distance from the kiosk.

In response to detecting the wireless kiosk communication channel, the smart card may transfer the encrypted data to the kiosk over the wireless kiosk communication channel.

The executable instructions stored on the smart card may purge encrypted data stored on the smart card when contact-based communication with the kiosk is not established within a pre-determined time period. The kiosk may purge encrypted data received from the smart card when contact-based communication is not established with the smart card within a pre-determined time period.

The smart card may include a non-transitory memory that stores executable instructions, such as software or firmware. The executable instructions, when run by the microprocessor, may implement various functions of the smart card.

Methods for improving transaction processing efficiency of an ATM, POS terminal or other self-service kiosk are provided. Methods may include using a blank smart payment card. The blank card may have a thickness that is not greater than 0.8 millimeters ("mm") and may include a wireless communication interface, a microprocessor, and a battery powering the wireless communication interface and the microprocessor. The wireless communication interface may include a network interface card (NIC) and an active near field communication (NFC) chip.

The method may include, at a first processor associated with a smart card issuer, identifying a dataset that includes sensitive card data. The method may include dynamically clustering the dataset into a random number of clusters. The method may include generating an encryption key for each cluster associated with the dataset. Each encryption key may be customized using past transaction data associated with the card. The method may include transmitting the encrypted clusters to the smart card.

The method may include, at the smart card, using the NIC, initiating a secure communication channel with the card issuer. The smart card may receive the encrypted data clusters and store them in temporary memory on the smart card. The method may include, using the NFC chip, initiating a secure communication channel with the self-service kiosk and self-authenticating the smart card to the self-service kiosk using the encrypted data clusters.

In response to self-authentication, the method may include purging the encrypted data clusters from temporary storage on the smart card.

The method may include, at the self-service kiosk, receiving the encrypted data clusters from the wireless interface of the smart card via NFC. The method may include obtaining a set of encryption keys from the card issuer. The method may include decrypting each cluster and reconstructing the dataset to authenticate the card. The method may include initiating a transaction based on the authentication.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that functional structural, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
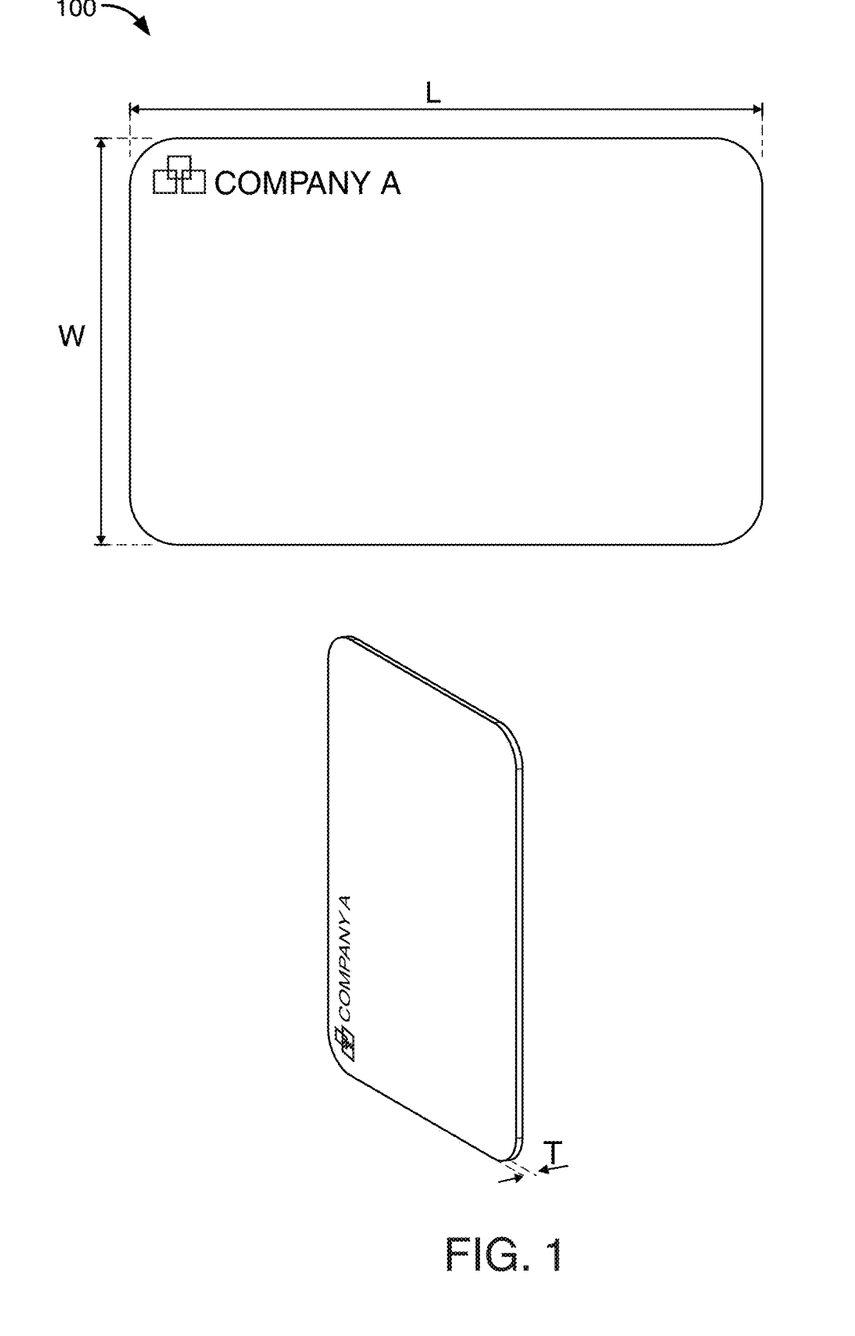
FIG. 1 shows illustrative apparatus in accordance with principles of the disclosure.

FIG. 1 shows illustrative blank smart card 100. Smart card 100 may include a microprocessor and other components for capturing, encrypting, and storing sensitive data received from a card issuer. Smart card 100 may also include executable instructions for packaging the sensitive data received from the card issuer for self-authentication at a kiosk. Smart card 100 may purge the sensitive data after it has been transferred to a kiosk.

FIG. 1 also shows that smart card 100 has width w and length 1. Smart card 100 may be any suitable size. For example, width w may be 53.98 millimeters ("mm"). Length 1 may be 85.60 mm. Smart card 100 has a thickness t. An illustrative thickness may be 0.8 mm. An exemplary form factor of smart card 100 may be 53.98 mm×85.60 mm×0.8 mm. This exemplary form factor may allow smart card 100 to fit into a user's wallet or pocket. This exemplary form factor may allow smart card 100 to fit into a card reader of a kiosk.

Figure 2:
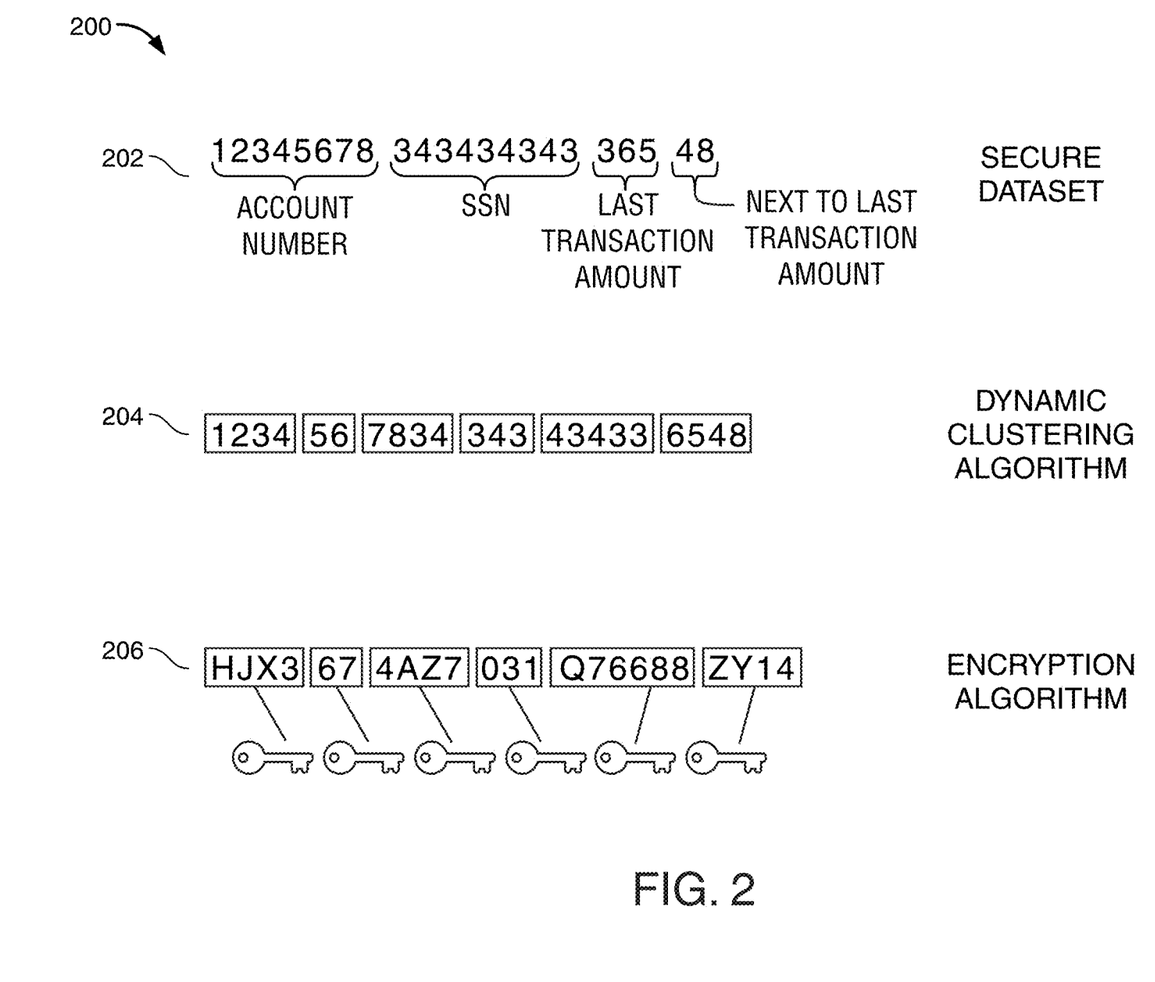
FIG. 2 shows an illustrative process in accordance with principles of the disclosure.

FIG. 2 shows illustrative process 200. In process 200, a card issuer may define sensitive dataset 202. Dataset 202 shows an illustrative user account number, user social security number, as well as transaction amounts from past transactions with the card, but any suitable identification data may be included in the dataset.

The card issuer may apply a dynamic clustering algorithm to dataset 202 to generate clusters 204. The dynamic clustering algorithm may divide the dataset into a random number of clusters.

The card issuer may generate a separate encryption key for each of the clusters. The encryption keys may incorporate customized data associated with the card, such as past transaction data. The card issuer may apply an encryption algorithm to generate encrypted clusters 206 using the encryption keys.

In some embodiments, dataset 202 may be clustered, encrypted and securely stored locally on the smart card using the embedded microprocessor. In this embodiment, no external hardware or software such as a mobile device, laptop or desktop device is needed to generate the encrypted data clusters.

Figure 3:
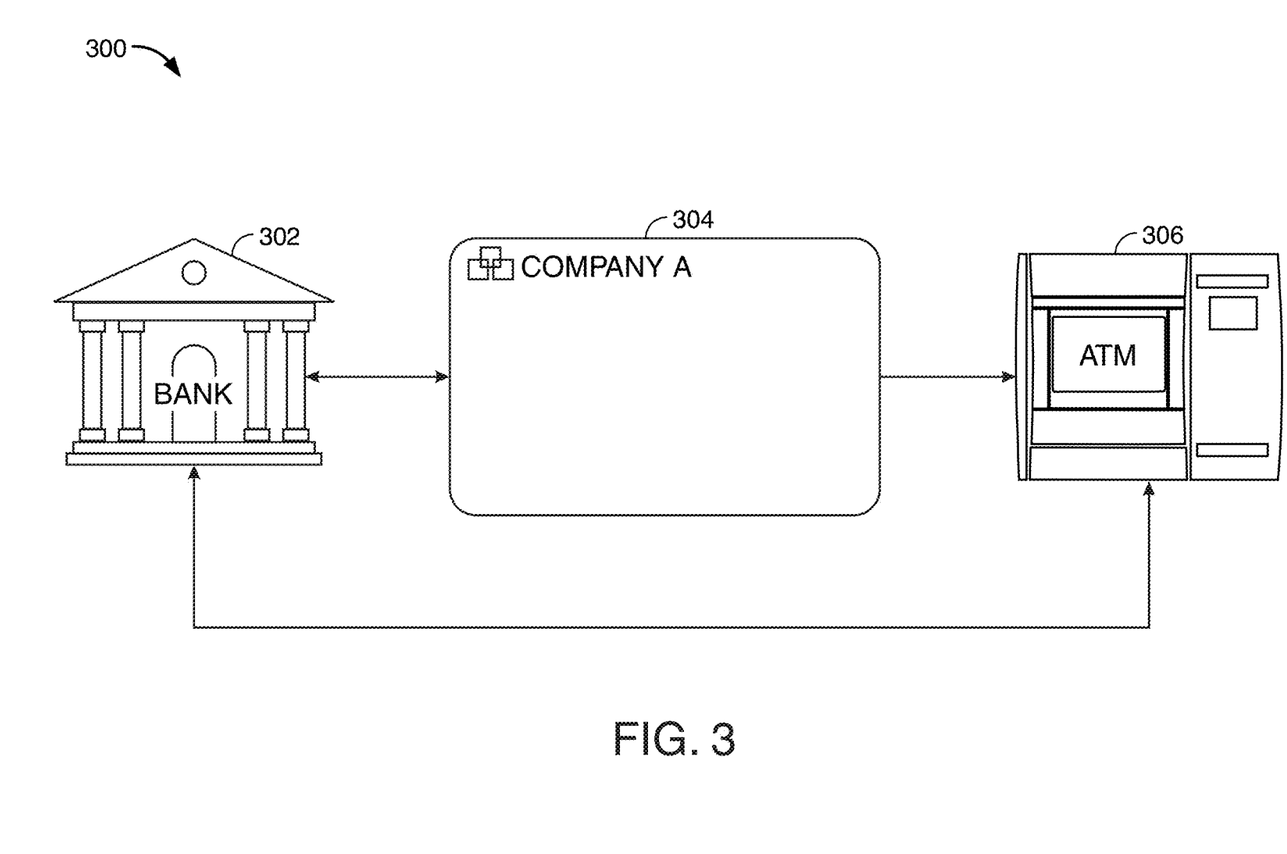
FIG. 3 shows an illustrative process in accordance with principles of the disclosure.

FIG. 3 shows illustrative process 300 for securing a transaction at a self-service kiosk. Illustrative process 300 includes ATM 306, but any suitable self-service kiosk may be used.

Bank 302 may generate encrypted data clusters from a dataset of sensitive data as shown in process 200, above. The data clusters may be transmitted to blank smart card 304. Smart card 304 may correspond to smart card 100, shown in FIG. 1.

The encrypted data clusters may be transferred to ATM 306 when smart card 304 is within a target distance of ATM 306. Smart card 304 may include circuitry for conducting NFC communication. The target distance may correspond to being within range for conducting NFC communication. A typical NFC communication range is ~2 in.

In other embodiments, the microprocessor of smart card 304 may be configured to dynamically limit or expand wireless transmitting and receiving ranges. The microprocessor may dynamically limit or expand wireless transmitting and receiving ranges in response to detected location of smart card 304.

Smart card 304 may include a global positioning system ("GPS") chip for receiving and/or transmitting GPS signals. The microprocessor of smart card 304 may determine a current location of the smart card based on the received GPS signals. In other embodiments, the microprocessor of smart card 304 may determine a current location of the smart card based on signal triangulation or location information received from a kiosk.

After the encrypted data clusters stored locally on smart card 304 are transferred to ATM 306, ATM 306 may obtain the customized encryption keys for the clusters from bank 302. ATM 306 may decrypt the encrypted data clusters and reconstruct the dataset to authenticate the smart card. In some embodiments, ATM 306 may validate the reconstructed dataset with bank 302.

The microprocessor of smart card 304 may purge any locally stored information following transfer to ATM 306 within a predetermined time window. Bank 302 may dynamically generate new encrypted clusters following transfer to ATM 306 within a predetermined time window and transmit them to smart card 304.

The process and apparatus shown in FIG. 3 will increase the security of smart card 304 and ATM 306 by preventing unauthorized users from accessing sensitive card data.

Figure 4:
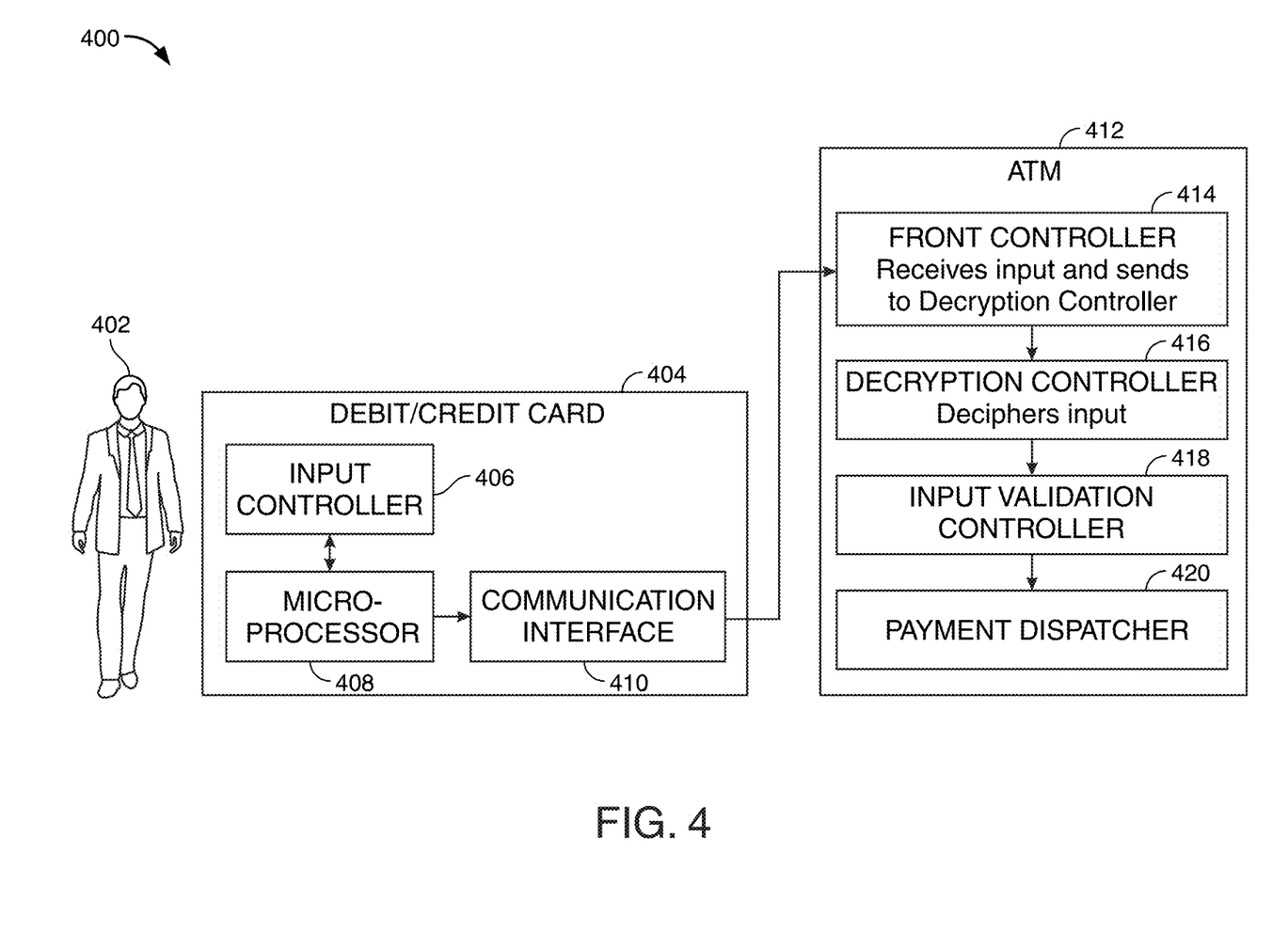
FIG. 4 shows an illustrative process in accordance with principles of the disclosure.

FIG. 4 shows illustrative components 400 of smart card 404 and ATM 412. Smart card 404 may correspond to smart cards 100 and 304, shown in FIGS. 1 and 3. ATM 412 may correspond to ATM 306, shown in FIG. 3.

User 402 may initiate a transaction using smart card 404. Smart card 404 may securely self-authenticate to ATM 412.

Smart card 404 includes input controller 406. Input controller 406 may capture data transmitted from a card issuer. In some embodiments, input controller 406 may encrypt the captured data. Input controller 406 may store captured data locally on smart card 404.

Encryption of data captured by input controller 406 may be performed by an encryption controller (not shown). The encryption controller may encrypt the data using any suitable encryption algorithm. Illustrative encryption algorithms include RSA cryptography, Blowfish, AES, RC4, RC5, and RC6.

Smart card 404 may have limited power resources and may utilize an energy efficient encryption algorithm. An illustrative energy efficient encryption algorithm may include RC5, Skipjack and Secure IoT ("SIT").

SIT is a symmetric key algorithm that utilizes a 64-bit block cipher and requires 64-bit key to encrypt data. Typical symmetric key algorithms are designed to take an average of 10 to 20 encryption rounds to maintain a strong encryption process. Each encryption round utilizes mathematical functions to create confusion and diffusion. Generally, the more encryption rounds that are executed, the more secure the algorithm. However, the more encryption rounds that are executed also increase the amount of power consumed by the encryption algorithm.

To minimize power consumption, SIT is limited to just five encryption rounds and each encryption round includes mathematical operations that operate on 4 bits of data. To sufficiently secure the encrypted data, SIT utilizes a Feistel network of substitution diffusion functions such that encryption and decryption operations are very similar. The reduced number of encryption rounds is offset by the relatively long 64 bit key.

Microprocessor 408 may control overall operation of smart card 404 and its associated components.

Microprocessor 408 may activate or deactivate any component of smart card 404. Based on detecting a communication channel associated with ATM 412, microprocessor 408 may activate one or more components of smart card 404. Smart card 404 may include a GPS chip for detecting a current location.

Smart card 404 also includes communication interface 410. Communication interface 410 may include a network interface or adapter. Communication interface 410 may include an active NFC chip. Communication interface 410 may include hardware and/or software for establishing a communication channel with a financial institution such as a card issuer (not shown). Communication interface 410 may be configured to implement protocols for wireless and/or wired communication with the card issuer.

Communication interface 410 may include hardware and/or software for establishing a communication channel with ATM 412. Communication interface 410 may be configured to implement protocols for wireless and/or wired communication with ATM 412.

A communication channel may be established when smart card 404 is within a threshold distance of ATM 412. For example, the communication channel may be an NFC channel established when smart card 404 and ATM 412 are within a close proximity of each other. In other embodiments, the communication channel may be a Wi-Fi communication channel.

FIG. 4 also shows illustrative components of ATM 412. ATM 412 includes front controller 414. Front controller 414 communicates with smart card 404 via communication interface 410.

Front controller 414 may include a network interface or adapter. Front controller 414 may include hardware and/or software for establishing a communication channel with smart card 404. Front controller 414 may be configured to implement protocols for wireless and/or wired communication with smart card 404.

Front controller 414 may receive authentication information stored on smart card 414 via communication interface 408. Front controller 414 may establish a wired or contact based connection with smart card 404. For example, front controller 414 may establish a wireless connection with smart card 404. Front controller 414 may include an NFC reader.

ATM 412 includes decryption controller 416. Decryption controller 416 may decrypt information received from smart card 404. Decryption controller 416 may connect to a remote computer server to obtain customized encryption keys for the clustered dataset received from smart card 404.

The decrypted information may be passed to input validation controller 418. Input validation controller 418 may connect to a remote computer server to validate authentication information received from smart card 404.

After input validation controller 418 validates the information, input validation controller 418 may issue instructions to payment dispatcher 420.

Figure 5:
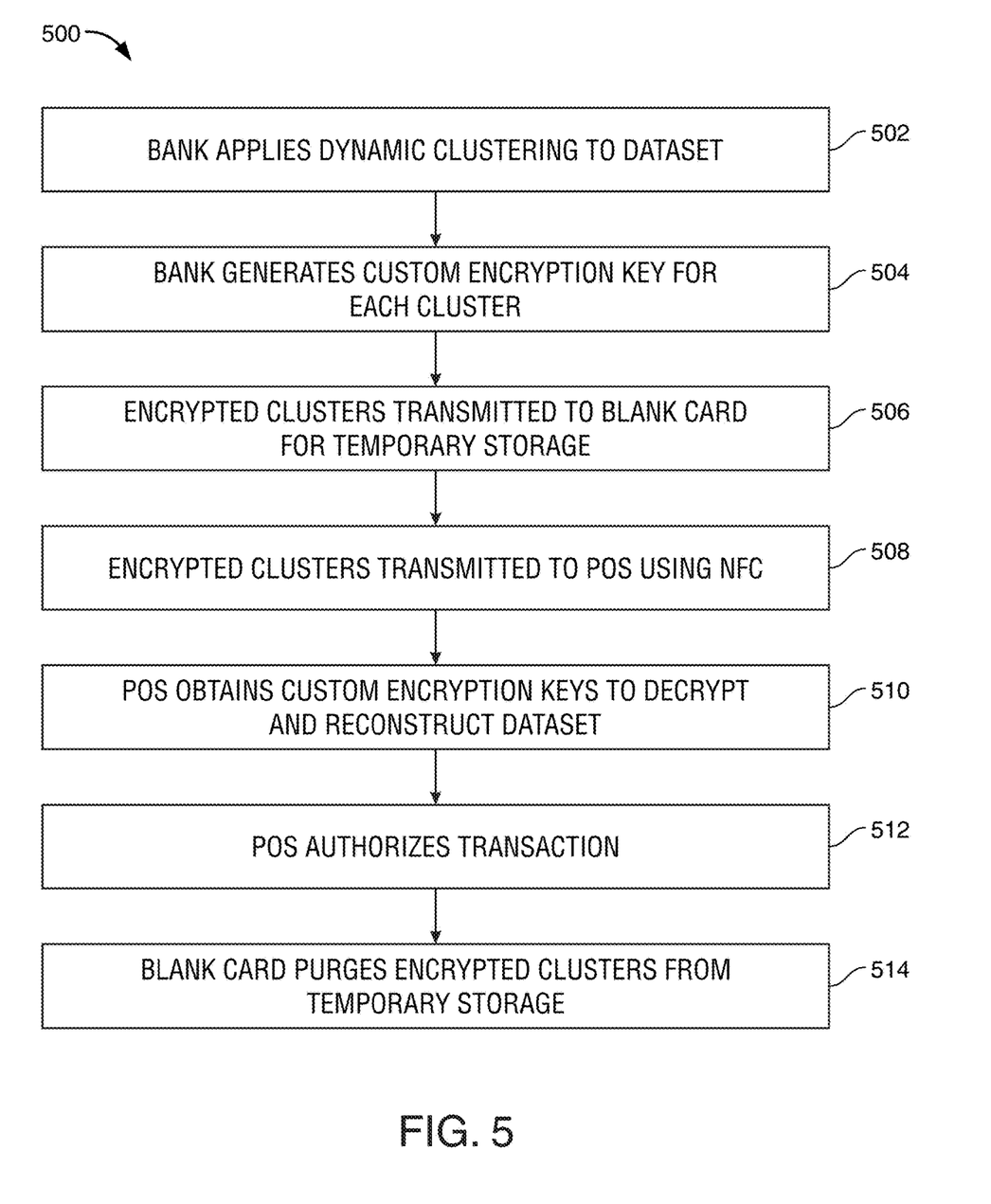
FIG. 5 shows an illustrative process in accordance with principles of the disclosure.

FIG. 5 shows illustrative process flow 500 for securing a transaction at a self-service kiosk. At step 502, a bank such as a card issuer applies dynamic clustering to dataset that includes sensitive user data. At step 504, the bank generates a custom encryption key for each cluster. The encryption keys may include data from past transactions associated with the card. Each key may be an alphanumeric string and may be applied using any suitable encryption algorithm.

At step 506, the encrypted clusters are transmitted to a blank smart card. The smart card may store the encrypted clusters in temporary storage. At step 508, the smart card may self-authenticate at a POS by transmitting the encrypted clusters to a POS terminal using NFC.

At step 510, the POS terminal may obtain the custom encryption keys directly from the bank. The system may use existing secure communication rails that have been established for transaction authorization. The POS terminal may use the encryption keys to decrypt the clustered sensitive transaction data and reconstruct the dataset. The POS terminal may validate the dataset to authorize the transaction.

In response to the authentication, the bank may apply a new round of dynamic clustering to the dataset. The bank may transmit new encrypted clusters to the card. The card may purge the old encrypted clusters from temporary storage and store the new encrypted clusters. In some embodiments, the card may automatically purge the encrypted dataset after a transaction. In some embodiments, the card may purge the encrypted dataset in response to receiving a new encrypted dataset from the bank.

Thus, methods and apparatus for BLANK CARD WITH DYNAMIC DATA CLUSTER ENCRYPTION are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for improving transaction security of a self-service kiosk, the system comprising a smart card having a thickness not greater than 0.8 millimeters ("mm") and a surface area not greater than 86 mm×54 mm and comprising:
    a wireless communication interface comprising a network interface card (NIC) and a near-field communication (NFC) chip;
    a microprocessor;
    a battery powering the wireless communication interface and the microprocessor; and
    executable instructions stored in a non-transitory memory, that when run by the microprocessor:
        using the NIC, initiate a secure connection with a financial institution and receive an encrypted dataset, the dataset dynamically clustered into a random number of clusters prior to encryption, each cluster associated with a separate encryption key;
        using the NFC chip, initiate a secure communication channel with the self-service kiosk and self-authenticate the smart card to the self-service kiosk using the encrypted dataset clusters; and
        purge the encrypted dataset clusters from temporary storage on the smart card;
    the self-service kiosk comprising:
        a front controller that receives the encrypted dataset clusters from the wireless interface via NFC;
        a decryption controller that decrypts the encrypted dataset clusters using a set of encryption keys obtained from a remote computer server associated with the financial institution; and
        an input validation controller that validates the encrypted dataset clusters before executing a transaction.

2. The smart card of claim 1, wherein the smart card is a blank card that does not store data on a magnetic stripe or EMV chip.

3. The smart card of claim 1, each encryption key generated from past transaction data associated with the smart card.

4. The smart card of claim 1, the dataset comprising a user identifier and past transaction data associated with the smart card.

5. The smart card of claim 1, the self-service kiosk comprising a point-of-sale device.

6. The smart card of claim 1, the self-service kiosk comprising an automated teller machine (ATM).

7. The smart card of claim 1, wherein:
    the wireless interface comprises an inactive state in which the wireless interface is unable to transmit data and an active state in which the wireless interface is capable of transmitting data; and
    the microprocessor toggles the wireless interface from the inactive state to the active state in response to receiving a signal from the self-service kiosk.

8. The smart card of claim 1, further comprising a pressure sensitive button having a thickness that is not greater than 0.8 mm, wherein:
    the wireless interface comprises an inactive state in which the wireless interface is unable to transmit data and an active state in which the wireless interface is capable of transmitting data; and
    the microprocessor toggles the wireless interface from the inactive state to the active state in response to actuation of the pressure-sensitive button.

9. A method for improving transaction security of a self-service kiosk using a blank smart payment card, the smart card having a thickness that is not greater than 0.8 millimeters ("mm") and comprising a microprocessor, a wireless communication interface comprising a network interface card (NIC) and an active near field communication (NFC) chip, and a battery powering the microprocessor and the wireless communication interface, the method comprising:
    at the smart card:
        using the NIC, initiating a secure connection with a financial institution and receiving a dataset comprising sensitive identification data, the dataset dynamically clustered into a random number of clusters, each cluster encrypted using a separate encryption key;
        storing the encrypted clusters in temporary storage on the smart card;
        using the NFC chip, initiating a secure communication channel with the self-service kiosk and self-authenticating the smart card to the self-service kiosk using the encrypted data clusters;
purging the encrypted data clusters from temporary storage on the smart card;
at the self-service kiosk:
receiving the encrypted data clusters from the wireless interface via NFC;
decrypting the encrypted data clusters using a set of encryption keys obtained from a remote computer server associated with the financial institution;
validating the encrypted data clusters and, in response to the validating, executing a transaction.

10. The method of claim 9, the blank smart payment card comprising a card that does not store data on a magnetic stripe or EMV chip.

11. The method of claim 9, each encryption key customized using past transaction data associated with the smart payment card.

12. The method of claim 9, the dataset comprising a user identifier and past transaction data associated with the smart payment card.

13. The method of claim 9, the self-service kiosk comprising a point-of-sale device.

14. The method of claim 9, the self-service kiosk comprising an ATM.

15. The method of claim 9, wherein:
the wireless interface comprises an inactive state in which the wireless interface is unable to transmit data and an active state in which the wireless interface is capable of transmitting data; and
the microprocessor toggles the wireless interface from the inactive state to the active state in response to receiving a signal from the self-service kiosk.

16. The method of claim 9, wherein the microprocessor is configured to dynamically limit or expand transmitting and receiving ranges of the wireless interface.

17. One or more non-transitory computer-readable media storing computer-executable instructions which, when executed by a processor on a computer system, perform a method for improving transaction security at a self-service kiosk, the method comprising:
at a first processor associated with a payment card issuer:
dynamically clustering a dataset comprising sensitive payment card data into a random number of clusters;
generating a set of encryption keys for the dataset, the set of encryption keys comprising a different encryption key for each cluster in the dataset; and
transmitting encrypted clusters to the payment card;
at a microprocessor embedded in the payment card:
using a wireless interface embedded in the payment card:
initiating a secure communication channel with the card issuer and receiving the encrypted data clusters;
initiating a secure communication channel with the self-service kiosk and self-authenticating the payment card to the self-service kiosk using the encrypted data clusters;
in response to self-authenticating the payment card, purging the encrypted data clusters from temporary storage on the payment card;
at a second processor associated with the self-service kiosk:
receiving the encrypted data clusters from the wireless interface embedded in the payment card;
decrypting the encrypted data clusters using the set of encryption keys obtained from the first processor;
executing the transaction in response to validation of a reconstructed dataset.

18. The media of claim 17, the payment card having a thickness that is not greater than 0.8 millimeters ("mm"), the wireless communication interface comprising a network interface card (NIC) and an active near field communication (NFC) chip.

19. The media of claim 18, wherein:
the wireless interface establishes a secure communication channel with the first processor via Wi-Fi using the embedded NIC; and
the wireless interface establishes a secure communication channel with the second processor via NFC using the active NFC chip.

20. The media of claim 17, wherein each encryption key is generated from past transaction data associated with the smart card.

21. The media of claim 17, wherein:
the dynamic clustering is a first dynamic clustering;
the first processor is configured to dynamically cluster the dataset into a second set of clusters;
the microprocessor is configured to purge the encrypted clusters from temporary storage on the smart card in response to receiving the second set of encrypted clusters from the first processor.

* * * * *